United States Patent [19]
Nakamura

[11] Patent Number: 5,964,933
[45] Date of Patent: Oct. 12, 1999

[54] BIODEGRADABLE MOLDING MATERIAL

[75] Inventor: Kenichi Nakamura, Takarazuka, Japan

[73] Assignee: Industrial Technical R & D Laboratory, Inc., Hyogo, Japan

[21] Appl. No.: 08/884,778

[22] Filed: Jun. 30, 1997

Related U.S. Application Data

[63] Continuation-in-part of application No. 08/770,087, Dec. 19, 1996, abandoned.

[30] Foreign Application Priority Data

Mar. 5, 1996 [JP] Japan ................................ 8-078400
May 26, 1997 [JP] Japan ................................ 9-152828

[51] Int. Cl.$^6$ .............................. C08L 1/02; B32B 19/00
[52] U.S. Cl. ............................. 106/203.1; 106/217.7; 106/163.01; 428/35.6; 428/35.7; 428/480; 428/481; 523/128; 524/35
[58] Field of Search ........................... 106/163.01, 203.1, 106/203.2, 217.7; 428/532, 35.6, 35.7, 480, 481; 523/128, 129; 524/27, 35

[56] References Cited

U.S. PATENT DOCUMENTS 5,206,087  4/1993  Tokiwa et al. ..................... 428/35.6
5,545,485  8/1996  Hashitani et al. .................. 428/480
5,599,999  2/1997  Moriya et al. ..................... 564/477

*Primary Examiner*—Michael Marcheschi
*Attorney, Agent, or Firm*—Koda & Androlia

[57] ABSTRACT

The object of the present invention is to provide an inexpensive biodegradable molding material which allows easy adjustment of the biodegradability of the material as a molding material, which undergoes 100% degradation within a fixed period following use in molded articles without requiring any excessively long time for degradation, which has a high heat resistance, and therefore, can be used to mold disposable food containers or foodstuff packaging trays which are steam-sterilizable, as well as planting pots which allow the transplantation of young plants, etc. into the soil together with the planting pots, which possesses water resistance, and which is superior in terms of material strength and moldability. 51 to 70 wt % powdered paper and 30 to 49 wt % biodegradable aliphatic polyester resin are mixed with a consideration of biodegradability, moldability and material strength, etc. in accordance with the application involved so as to obtain a biodegradable molding material. This molding material undergoes 100% biodegradation within 90 days. Virgin pulp or old paper which are finely pulverized to a size of 2 mm pass is suitable for use as the aforementioned powdered paper.

2 Claims, 1 Drawing Sheet

BIODEGRADABLE MOLDING MATERIAL

This is a continuation-in-part of application Ser. No. 08/770,087, filed Dec. 19, 1996, abandoned.

BACKGROUND OF THE INVENTION

1. Field of the Invention

The present invention relates to a biodegradable molding material wherein the rate of biodegradation is adjustable and it's moldability is superior, and more particularly to a biodegradable molding material which undergoes 100% biodegradation in a short period of time, and which is used to provide short-term packaging materials as molded articles, e.g., one-way foodstuff packaging trays for display in supermarkets, and planting pots which do not require vessel recovery when seedlings or the like are transplanted.

2. Prior Art

Conventionally, foamed plastics such as foamed styrol, etc., have been mainly used in foodstuff packaging trays, which are materials for the short-term packaging of foodstuffs displayed in supermarkets. In recent years, furthermore, molded petrochemical materials such as polyvinyl chloride and polypropylene, etc., have begun to appear in planting pots in place of fired materials such as ceramics and clay, etc., as a result of the light weight and low cost of such petrochemical materials.

However, because of the permanent nature of plastic molded articles using such petrochemical materials, packaging materials such as foodstuff packaging trays, etc. after use for packaging foodstuffs and planting pots after the removal and transplantation of young plants or grown plants from the pots constitute non-biodegradable rubbish. Especially in the case of foodstuff packaging trays, disposal is a major problem, since the quantity of such materials used is large. Even in the case of disposal of such material by incineration, considerable quantities of toxic gases are generated; and the burden on incinerators is great. Accordingly, it cannot be said that such materials are easy on the environment.

In recent years, because of the problems of such plastic molded articles, various types of biodegradable resins have been developed as molding materials which can be discarded without incineration after short-term use rather than long-term use. Numerous biodegradable resins have appeared, including resins which are chemically synthesized using natural polymer type starches, chitosan, cellulose, etc. as raw materials, polyester type resins produced by microorganisms using fermentation processes, and aliphatic polyester type resins produced by chemical synthesis, etc. These resins have begun to be used in some applications as biodegradable molded articles.

The various types of biodegradable resins described above show a maximum of only 90% biodegradation even when buried in the earth for 365 days. No experimental example that shows 100% biodegradation has yet been published. Furthermore, in cases where these biodegradable resins are used "as is" in biodegradable molded articles, the thickness of the molded articles is generally 0.2 to several millimeters. Accordingly, an excessively long time is required for biodegradation. Furthermore, the moldability is poor as seen in the case of starch type resins, and the materials are expensive. Thus, these materials are not yet suitable for practical use.

Furthermore, in the case of foodstuff packaging materials such as foodstuff packaging trays, etc., which are consumed and discarded in large quantities in every household on a daily basis, there is a need for inexpensive biodegradable packaging materials which can quickly be degraded by natural processes after the contents of the packaging have been consumed. In such cases, it is conceivable that polylactic acids, which are biodegradable aliphatic polyester resins, might be used as foodstuff packaging materials. However, such resins have a low heat resistance, i.e., 59° C.; accordingly, these resins cannot be steam-sterilized, and therefore, cannot be used as food containers, etc. Meanwhile, in the case of planting pots, there is a need for inexpensive molding materials which are superior in terms of moldability, which are also superior in terms of water resistance and material strength during the period of seedling growth, which quickly undergo biodegradation following transplantation of young plants transplanted into the soil together with the planting pot, and which degrade naturally without having any detrimental effect on the natural environment.

SUMMARY OF THE INVENTION

The present invention was devised in light of the above-described points.

The object of the present invention is to provide an inexpensive biodegradable molding material which allows easy adjustment of the biodegradability of the material as a molding material, which undergoes 100% degradation within a fixed period following use in molded articles without requiring any excessively long time for degradation, which has a high heat resistance and can therefore be used to mold disposable food containers or foodstuff packaging trays which are steam-sterilizable, as well as planting pots which allow the transplantation of young plants, etc., into the soil together with the planting pots, which possesses water resistance, and which is superior in terms of material strength and moldability.

In order to accomplish the object, the present inventor conducted diligent research concerning biodegradable molding materials which satisfy the above-described requirements. As a result, it was discovered that the problems can be solved by a material obtained by mixing 51 to 70 wt % powdered paper with 30 to 49 wt % biodegradable aliphatic polyester resin (hereafter referred to as "BDP" (an abbreviation for "biodegradable polymer"). This discovery led to the present invention.

DETAILED DESCRIPTION OF THE INVENTION

Figure 1:
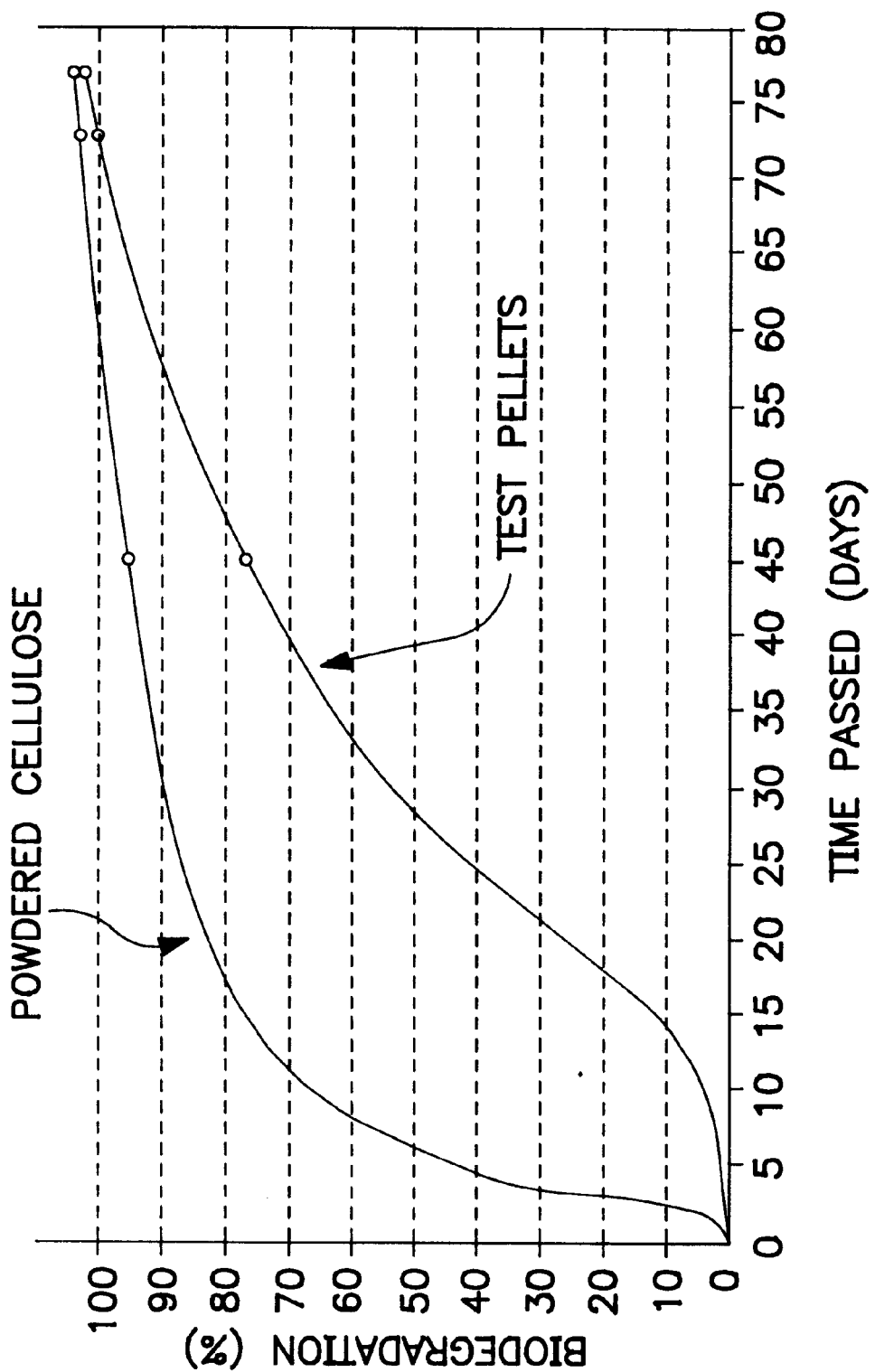
FIG. 1 is a graph which shows the transition of the average percent biodegradation over time for test pellets obtained from the molding material of the present invention and cellulose constituting a comparative substance.

This biodegradable molding material is suitable for use in disposable food containers and foodstuff packaging trays and is further suitable for use in planting pots which allow the transplantation of young plants, etc., into the soil together with the planting pots. In such cases, a superior moldability and material strength are obtained; and at the same time, the time required for biodegradation can be adjusted in accordance with the type of plant being transplanted by adjusting the mixture ratio of the components of the molding material. Accordingly, waste problems can be avoided, and planting pots which do not interfere with the growth of transplanted plants can be manufactured.

Examples of BDP's which can be mixed with the powdered paper used in the present invention include polycaprolactones, polylactic acids, lactide/glycoilide copolymers, polyhydroxy butyrate/hydroxy butyrate/hydroxy valerate copolymers, butanediol/adipic acid copolymers, and butanediol/succinic acid copolymers, etc. However, polylactic acids are especially desirable for use.

It is desirable that the powdered paper used be a powder of a virgin pulp or a powder of used paper (high quality used paper) obtained by finely pulverizing such a virgin pulp or used paper to a size of 2 mm pass. In this way, the fluidity of the material during molding and the moldability of molded articles can be improved.

The biodegradable molding material of the present invention is used in pellet form, with a prescribed weight percentage of a BDP and a prescribed weight percentage of powdered paper mixed within the weight ratio range described above in accordance with the intended application. These pellets are placed in an injection molding machine, and a prescribed quantity of the molding material is molded by being injected into a mold cavity. Alternatively, the mixed molding material can be directly extrusion-molded (without forming the material into pellets) into a molded article having the desired cross-sectional shape using a biaxial extrusion molding machine and molding die.

In such cases, since the amount of powdered paper in the molding material is 51% or greater, the molded articles are classified as paper. However, the material can be molded in the same manner as plastic. In the composition ratio (weight ratio) of BDP and powdered paper, the moldability and material strength drop as the amount of powdered paper is increased, while the moldability and material strength are improved as the amount of BDP is increased. In this latter case, however, the biodegradability is retarded. Accordingly, the composition ratio is appropriately set in accordance with the intended application. If necessary, appropriate amounts of aggregates or coloring agents, etc. may also be added at the time of molding.

Furthermore, by setting the composition ratio of the powdered paper and BDP in the above-described range, it is possible to obtain a molding material which will undergo 100% biodegradation within 90 days. Moreover, the powdered paper has a high heat resistance; accordingly, though the heat resistance of the BDP is low, the heat resistance of the molding material can be set at a high value. For instance, a pellets having a heat resistance of 114° C. can be manufactured using 55 wt % powdered paper and 45 wt % polylactic acid. Accordingly, steam sterilization of the molded articles is possible. Moreover, the molded articles can be incinerated with a low thermal energy and no pollution.

Furthermore, by using inexpensive powdered paper at the rate of 51 wt % or greater, the cost of the molding material can be reduced to 500 yen/kg or less, which is less than half the cost of ordinary biodegradable resins (1000 to 2000 yen/kg). Thus, a molding material with good all-purpose characteristics can be obtained.

In the biodegradable molding material of the present invention, the material strength and rate of biodegradation of molded articles can be adjusted by adjusting the thickness of the molded articles and the composition of powdered paper and BDP (within a composition range of 51 to 70 wt % powdered paper and 30 to 49 wt % BDP).

Next, a case in which the biodegradable molding material of the present invention is formed into pellets will be described in concrete terms in an embodiment. However, the present invention is not limited to this embodiment.

1. Virgin pulp is finely pulverized by means of a pulverizer, and this pulverized pulp is passed through a 2 mm pass orifice, thus producing a powdered paper with a size of 2 mm or less on each side.

2. A biodegradable plastic ECOPLA (composition: polylactic acid) manufactured by Cargill, Inc. (U.S.A.) is used as a BDP (biodegradable aliphatic polyester resin).

3. 51 wt % powdered paper and 49 wt % BDP are put into a pressurized heated kneader mixer, and steam is supplied to the jacket of this kneader mixer; the ingredients are mixed to form a paste while being heated to a temperature of 170 to 180° C.(for approximately 10 minutes).

4. This paste is placed in a biaxial extruder and extruded; the extruded parison (diameter: 3 mm) is then hot-cut to 3-mm lengths and cooled by air blowing, thus producing pellets of a biodegradable molding material with a light brown color.

The physical properties of the obtained molding material pellets are as follows: specific gravity: 1.30, tensile breaking strength: 515 kgf/cm$^2$, bending breaking strength: 735 kgf/cm$^2$, Izod impact value: 2.9 kg-cm/cm, thermal deformation temperature: 110° C., combustion calories: 4.360 kcal/kg. The above strength values are essentially equal to those of all-purpose plastics. (Furthermore, the heat resistance in the case of a composition of 55 wt % powdered paper and 45 wt % BDP is 114° C.)

A biodegradation test was performed on the obtained biodegradable molding material pellets at the laboratory of ORGANIC WASTE SYSTEMS N.V. in Belgium. Testing was performed on the pellets of the present invention (which constituted the test substance) and powdered cellulose (for thin-layer chromatographic use; constituting a comparative substance).

More specifically, in the test, the pellets constituting the test substance and the powdered cellulose constituting the comparative substance were subjected to a biodegradation test; and under dry conditions and good ventilation, a prescribed quantity of the pellets or powdered cellulose was mixed with a 12-fold amount (weight ratio) of a microorganism inoculation source (which was subjected to stabilization and aeration over a period of 16 weeks in a laboratory vessel, using the organic matter in solid waste obtained at the waste treatment plant of the city of Brecht in Belgium as a raw material); afterward, each mixture was supplied to a reaction tank, and small amounts of water were added during the test, with the temperature maintained at a constant 58° C. Biodegradation was determined by calculating the carbon dioxide ($CO_2$) production rate during decomposition, and the total amount of carbon dioxide produced. Biodegradability was determined by measuring the respective carbon contents of the test substance and the comparative substance (the carbon content was 46.4% for the test pellets and 43.3% for the powdered cellulose), and then calculating the percent biodegradation as the percentage of solid carbon in the test substance or comparative substance that was converted into gaseous mineral carbon ($CO_2$).

Table 1 shows the results obtained when the percent biodegradation was calculated after 45 days and 77 days, respectively, in the above test. The percentages shown indicate the ratio of "gaseous carbon captured as carbon dioxide upon the completion of the reaction" to "initial amount of carbon added to the system". Furthermore, FIG. 1 shows the transition of the average percent biodegradation over time.

[TABLE 1]

Percent Biodegradation After 45 and 77 days

| Test substance | Average amount of carbon added to the system | Average amount of gaseous carbon | Average percent biodegradation |
|---|---|---|---|
| After 45 days | | | |
| Cellulose | 43.4 | 41.3 | 95.3 |
| Test pellets | 40.0 | 35.5 | 76.5 |
| After 77 days | | | |
| Cellulose | 43.4 | 44.8 | 103.2 |
| Test pellets | 46.6 | 47.5 | 101.9 |

The quality of the microorganism inoculation source used in the above biodegradation test was good, and the powdered cellulose used as a comparative substance was easily and completely biodegraded. As shown in Table 1 and FIG. 1, the conversion rate of powdered cellulose after 45 days was 95.3%, and the percent biodegradation after 77 days was 103.2%.

As shown in FIG. 1, the biodegradation of the test pellets was gradual for approximately one week after the initiation of testing but started at a solid rate. After 45 days, the biodegradation of the pellets reached the high level of 76.5%, and degradation continued to proceed actively. Following an addition extension of one month, it was ascertained that biodegradation was completed. This was supported by the fact that the pellets were completely decomposed and had disappeared.

According to the biodegradable molding material of the present invention claimed in claim 1, the material mainly comprises a 51 to 70 wt % of inexpensive powdered paper, to which a biodegradable aliphatic polyester resin is added. Accordingly, while possessing a moldability comparable to that of conventional biodegradable resins, the molding material of the present invention is less than half as expensive as conventional biodegradable resins. Thus, the present invention makes it possible to provide a biodegradable molding material which is superior in terms of all-purpose characteristics and which allows the inexpensive molding of molded articles.

Furthermore, the molding material of the present invention is classified as a paper, but it can be molded in the same manner as a plastic and has a strength comparable to that of an all-purpose plastic. Moreover, since the material of the present invention undergoes 100% biodegradation within 90 days, molded articles manufactured using this material do not require incineration, and therefore, do not pollute the environment. Accordingly, the material of the present invention is especially effective (from the standpoint of disposal) when used in foodstuff packaging trays, which are short-term foodstuff packaging materials that are consumed in large amounts.

In addition, because of the powdered paper which is used to form the material of the present invention, the material has an improved heat resistance compared to conventional biodegradable resins and can therefore be subjected to steam sterilization. Despite this fact, the thermal energy of the material during incineration, etc. is low, so that the material can be discarded or burned without generating harmful gases during incineration.

Furthermore, in cases where the material of the present invention is used in, for instance, planting pots, it is, by adjusting the thickness of the molding and the weight ratio of the powdered paper and the biodegradable resin, possible to use the planting pots as ordinary planting pots during the growth of young plants and then to bury the plants in soil together with the planting pots at the time of transplantation taking advantage of the biodegradability of the pots, and there is no need for recovery, etc. Thus, the material of the present invention can be used in molded articles which undergo biodegradation in an advantageous manner in accordance with the application involved.

According to the invention claimed in claim 2, virgin pulp or old paper which has been finely pulverized to a size of 2 mm pass is used as powdered paper; accordingly, a biodegradable molding material which offers good material fluidity during molding and good moldability of molded articles can be obtained.

I claim:

1. A biodegradable molding material characterized in that said material comprises 51 to 70 wt % powdered paper and 30 to 49 wt % biodegradable aliphatic polyester resin, and said material undergoes 100% biodegradation within 90 days.

2. A biodegradable molding material according to claim 1, wherein said powdered paper is produced by finely pulverizing virgin pulp or used paper to a size of less than 2 mm.

* * * * *